United States Patent [19]
Rhodes

[11] 3,727,272
[45] Apr. 17, 1973

[54] FLEXIBLE MATERIAL HOLDING DEVICE

[76] Inventor: Patrick Dey Rhodes, 3258 Richard Avenue N.E., Roanoke, Va. 24012

[22] Filed: Oct. 15, 1970

[21] Appl. No.: 80,868

[52] U.S. Cl. ................ 24/81 T, 24/81 AB, 24/253, 24/DIG. 22
[51] Int. Cl. ........................................... A44b 21/00
[58] Field of Search ......................... 24/81, 82–84, 24/85, 259, 243, 248, 252

[56] References Cited

UNITED STATES PATENTS

| | | | |
|---|---|---|---|
| 524,834 | 8/1894 | Mayent | 24/81 T |
| 1,205,889 | 11/1916 | Halvorson | 24/259 GC |
| 972,439 | 10/1910 | Cutler | 24/84 R |
| 3,026,581 | 3/1962 | Collin et al | 24/84 R X |
| 3,290,743 | 12/1966 | Hanson | 24/81 T |
| 3,058,183 | 10/1962 | Hawie | 24/81 GS |
| 1,784,717 | 12/1930 | Barnes | 24/81 DM |
| 787,899 | 4/1905 | Curry | 24/82 |
| 3,096,551 | 7/1963 | Shoberg | 24/81 CC |

FOREIGN PATENTS OR APPLICATIONS

| | | | |
|---|---|---|---|
| 1,554,176 | 11/1969 | Germany | 24/81 T |
| 21,247 | 11/1891 | Great Britain | |
| 16,980 | 2/1910 | Great Britain | 24/81 GS |

*Primary Examiner*—Paul R. Gilliam
*Attorney*—Sughrue, Rothwell, Mion, Zinn & Macpeak

[57] ABSTRACT

A flexible material holding device comprising: an elastic band and a pair of clips secured to the ends of the band and adapted to engage and removably retain the ends of a flexible material cover for the purpose of removably retaining it in place on an object or objects on which it is mounted. Each of the clips comprises a pair of pivotably connected arms having gripping portions that are biased into engagement by a spring member. The gripping portion of each arm comprises a concave section which merges with a convex end section. The end of the gripping portion of one clip overlaps the end of the gripping portion of the other clip. The concave and convex sections of the one clip are adapted to engage the convex and concave sections, respectively, of the other clip so that flexible material inserted between the gripping portions of the clip arms is gripped in two places by each of the clips. The reverse curvature of the clip arms facilitates the insertion of the flexible material between the gripping portions thereof, prevents tearing of the flexible material retained therebetween, and increases the gripping ability of the clips.

9 Claims, 4 Drawing Figures

PATENTED APR 17 1973  3,727,272

INVENTOR
PATRICK DEY RHODES

BY Sughrue, Rothwell, Mion, Zinn & Macpeak

ATTORNEYS

FLEXIBLE MATERIAL HOLDING DEVICE

BACKGROUND OF THE INVENTION

The present invention relates to a flexible material holding device and, more particularly, to such a device which utilizes an elastic band and a pair of spring biased clips for retaining a flexible material cover or the like on an object or objects.

Heretofore, many different types of holding devices have been utilized for retaining a flexible material cover or the like on an object. Substantially all of these devices have been subject to certain disadvantages. For example, certain of the prior art holding devices have not been capable of being used with flexible material covers or the like of different types and sizes. Other devices have not been capable of firmly holding flexible material covers in place when they have been subjected to tension. Many of the prior art holding devices which have been capable of holding the cover in place when it is tensioned have been constructed so as to damage or tear the ends of the flexible material being held by the device. A further disadvantage of certain of the previously used holding devices is that it has been difficult to insert the ends of the flexible material cloths or the like in the holding device, with the result that it has required a time consuming operation to retain a flexible material cloth or the like on an object or objects to be covered.

A need has thus arisen for a flexible material holding device which is simple in construction, can be easily used with flexible material cloths or the like of different types and sizes, and will not damage the flexible material cloth when it is under tension. The holding device of the present invention meets all of these requirements without being subject to any of the disadvantages described above.

SUMMARY OF THE INVENTION

The holding device of the present invention comprises an elastic band which is attached at its ends to a pair of clips having pivotally connected gripping arms that are urged into locking engagement by a spring. The gripping portions of the clip arms are disposed in overlapping relation, and each gripping portion comprises a concave section which merges into a convex end section. The outer convex and concave sections of the one clip arm are adapted to engage the inner convex and concave sections, respectively, of the other clip arm so as to provide two points of locking engagement between the clip arms. The end of a flexible material cloth or the like inserted between the inner and outer gripping portions of the clip arms, therefore, will be gripped at two different places so as to removably retain it within the clip.

Since the end section of the outer gripping portion is concavely curved, and is disposed adjacent the convexly curved portion of the inner gripping portion, an outwardly diverging opening is provided therebetween for the insertion of one end of the flexible material cloth. The insertion of the cloth between the gripping portions, therefore, is greatly facilitated. Secondly, since the flexible material is gripped by oppositely curved sections of the clip arm gripping portions, there will be little tendency for the flexible material to be damaged, even when subjected to tension. The provision of an open area between the locking sections or points of engagement of the gripping portions allows the flexible material to be gathered between these points and to further prevent tearing of the material when it is subjected to tension. Further, since the end section of the outer gripping portion is curved outwardly, it provides a smoothly curved surface in engagement with the flexible material and thus reduces any possibility of tearing of the material. If the flexible material cloth or the like is subjected to undue tension, the ends of the flexible material between the gripping portions of the clip arms will slip past the oppositely curved gripping surfaces on the clip arms and thus damage to the flexible material is further prevented.

DESCRIPTION OF THE PREFERRED EMBODIMENT

Figure 1:
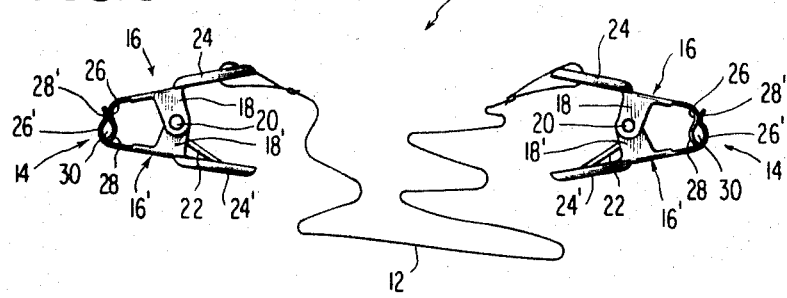
FIG. 1 is a side elevational view of a flexible material holding device constructed in accordance with the principles of the present invention.

As shown in FIG. 1, the holding device 10 of the present invention comprises an elastic band 12, which may be constructed or any suitable flexible and resilient material, and a pair of clips 14 which are secured to the ends of the elastic band 12 and are adapted to engage the ends of a flexible material cover or the like.

Each of the clips 14 may be formed of any suitable material, such as metal or plastic, and comprises a pair of arms 16, 16' which are provided with inwardly extending tabs 18, 18' that are pivotally connected by a pivot pin 20. Within the scope of this invention, the arms 16, 16' may be pivotally connected in any other suitable manner. A spring 22 of any suitable type serves to urge the arms to the positions shown in FIGS. 1 through 4, wherein the handle portions 24, 24' of the arms are disposed in spaced relation and the gripping portions of the arms are disposed in locking engagement. The ends of the elastic band 12 are looped through apertures in the handle portions 24, 24' of the clip arms 16, 16' and are secured in any suitable manner such as by a suitable locking or gripping device or an adhesive.

Figure 4:
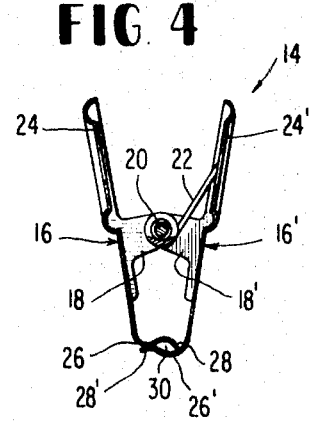
FIG. 4 is a sectional view taken substantially along line 4—4 in FIG. 3.

The gripping portions of the clip arms 16, 16' are disposed in overlapping, engaging relation. As shown in FIGS. 1 and 4, the gripping portion of the arm 16 is disposed within the gripping portion of the arm 16' and comprises a convexly curved section 26 which merges with a concavely curved end section 28. The gripping portion of the arm 16' comprises a concavely curved section 26' which is adjacent the concave section 28 of the arm 16, and a convexly curved section 28' which is adjacent the convex section 26 of the arm 16. In this manner, the oppositely curved sections of the gripping portions of the arms 16 and 16' are urged into locking engagement by the spring 22 at two spaced points on the gripping portions, as shown in FIGS. 1 and 4. An opening 30 is provided between the gripping portions of the arms 16 and 16' and between the points of locking engagement thereof.

Figure 2:
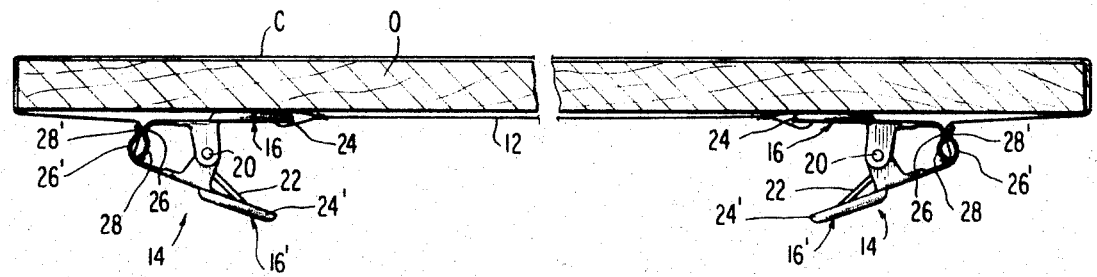
FIG. 2 is a side elevational view, partly in section, showing the holding device of the present invention being utilized to retain a flexible material cover or the like on an object.
Figure 3:
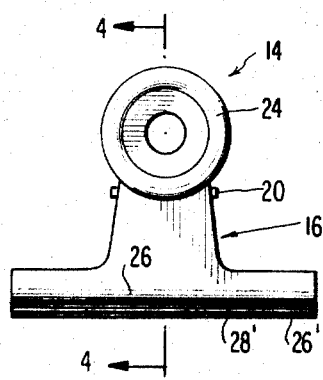
FIG. 3 is a front elevational view of a clip for use with the holding device of the present invention.

Although the holding device 10 of the present invention can be used for many different purposes, it is especially useful for holding a cover of flexible material on an object or objects in the manner shown in FIG. 2. In use, after the cover C has been fitted over the object O, one of the clips 14 is opened by pressing its handle portions 24, 24' inwardly so as to enable one end of the flexible cover C to be received within the gripping portions of the clip arms 16, 16'. Thereafter, the elastic band 12 is stretched, the other clip 14 is opened and the other end of the flexible cloth C is positioned between the gripping portions of the other clip arms 16, 16'. In this manner, the flexible cover C is retained in tightly fitting relation on the object O. The amount of tension applied to the cover C can be easily predetermined by varying the length or degree of elasticity of the elastic band 12. In the case of a table cloth, for example, the holding device 10 of the present invention serves to firmly retain the table cloth on a table and is disposed on the underside of the table so as to be hidden from view and so as not to be interfere with any of the space on the upper side of the table.

Each end of the flexible cover C is positively retained within the gripping portions of the arms 16 and 16' of each clip 14. The end of the flexible cover is engaged at two spaced points, as shown in FIG. 2, namely, at the point of engagement between the convex portion 26' of arm 16' and the concave end portion 28 of arm 16, and at the point of engagement of the concave end section 28' of arm 16' and the convex section 26 of arm 16. The engagement of the flexible material of the cover at the spaced points of engagement of the oppositely curved sections of the gripping portions of the arms 16 and 16' serves to positively retain the cover material within each clip 14 when it is in its normally locked position under the influence of the spring 22.

The oppositely curved sections of the gripping portions of the clip arms 16 and 16' provide smooth rounded surfaces for engagement with the flexible material of the cover C and thus effectively prevent damage to the flexible material when it is locked between the gripping portions. The outwardly diverging opening defined by the end section 28' of arm 16' and the convex section 26 of arm 16 greatly facilitates the insertion of the end of the flexible cover C between the gripping portions of the clip arms, and also serves to prevent damage to the flexible material resuting from its contact with the curved section 28' when the cover is under tension. Damage to the cover material is further prevented by the provision of the opening 30 between the points of engagement of the gripping portions of the clip arms 16 and 16'. The flexible material of the cover may be gathered within the opening 30 to further prevent the tearing of the material when it is placed under tension.

From the foregoing description, it will readily be seen that the holding device 10 of the present invention may be utilized to retain covers of various types of flexible material, such as paper, plastic or woven fabric, on an object or objects of various shapes without damaging the flexible cover material. If the cover is subjected to an undue amount of tension, the ends of the cover will tend to slip between the engaged curved sections of the gripping portions of the clip arms, and thus tearing of the flexible material cover will be prevented.

As illustrative examples, the holding device of the present invention may be utilized by itself or with one or more other holding devices of the same or similar construction to retain many different types of covers in place, such as table cloths, slip covers, boat covers, lawn furniture covers, car top luggage carrier covers and the like. The holding device of the present invention may be easily adapted for use with various types and sizes of covers by merely changing the size of the clips 14 and/or changing the length or degree of elasticity of the elastic band 12.

What is claimed is:

1. A holding device for a flexible cover or the like, comprising:
   a. an elastic band, and
   b. a pair of clips secured to the end portions of said elastic band and adapted to engage the end portions of the flexible cover, each of said clips comprising:
      1. first and second pivotally connected arms, said arms each having a handle portion and a gripping portion, said gripping portion being angularly offset relative to said handle portions with the gripping portion of said first arm being disposed within the gripping portion of said second arm,
      2. means for normally urging said handle portions into spaced apart relation and said gripping portions into engaging relation,
      3. said first arm gripping portion comprising a convexly curved section merging into a concavely curved end section,
      4. said second arm gripping portion comprising a convexly curved section adapted to engage said first arm concave section, and a concavely curved end section adapted to engage said first arm convex section at a point of engagement spaced from the point of engagement of said first arm concave section and said second arm convex section,
   whereby each clip is adapted to engage an end portion of said cover at said spaced points of engagement.

2. The device of claim 1 wherein said gripping portions of said first and second arms define an opening between said points of engagement in which an end portion of said flexible cover can be gathered to prevent damage thereto when said cover is tensioned.

3. The device of claim 1 wherein said handle portions are apertured to receive therethrough the end portions of said elastic band.

4. The device of claim 1 wherein said handle portions are at one end of said arms and said gripping portions are at the other end of said arms, said gripping portions extend substantially at right angles to said handle portions, and said arms are pivotally connected between said handle and said gripping portions.

5. The device of claim 4 wherein said urging means comprises a spring in engagement with said handle portions.

6. A clip for holding a flexible cover or the like, comprising:

a. first and second pivotally connected arms, said arms each having a handle portion and a gripping portion, said gripping portion being angularly offset relative to said handle portion with the gripping portion of said first arm being disposed within the gripping portion of said second arm, b. means for normally urging said handle portions into spaced-apart relation and said gripping portions into engaging relation, c. said first arm gripping portion comprising a convexly curved section merging into a concavely curved end section, and d. said second arm gripping portion comprising a convexly curved section adapted to engage said first arm concave section, and a concavely curved end section adapted to engage said first arm convex section at a point of engagement spaced from the point of engagement of said first arm concave section and said second arm convex section, whereby said clip is adapted to engage said cover at spaced points of engagement.

7. The clip of claim 6 wherein said gripping portions of said first and second arms define an opening between said points of engagement in which an end portion of said flexible cover can be gathered to prevent damage thereto when said cover is tensioned.

8. The clip of claim 6 wherein said handle portions are at one end of said arms and said gripping portions are at the other end of said arms, and said arms are pivotally connected between said handle and said gripping portions.

9. The clip of claim 8 wherein said urging means comprises a spring in engagement with said handle portions.

* * * * *